United States Patent
Holzer et al.

(10) Patent No.: US 12,434,460 B2
(45) Date of Patent: Oct. 7, 2025

(54) FLEXIBLE MULTILAYER FILM HAVING HIGH LOW-TEMPERATURE IMPACT STRENGTH FOR MEDICAL PACKAGINGS

(71) Applicant: PolyCine GmbH, Schiffweiler (DE)

(72) Inventors: Susanne Holzer, Ottweiler (DE); Rene Gross, Neunkirchen (DE)

(73) Assignee: PolyCine GmbH, Schiffweiler (DE)

( * ) Notice: Subject to any disclaimer, the term of this patent is extended or adjusted under 35 U.S.C. 154(b) by 0 days.

(21) Appl. No.: 18/549,270

(22) PCT Filed: Mar. 7, 2022

(86) PCT No.: PCT/EP2022/055728
§ 371 (c)(1),
(2) Date: Sep. 6, 2023

(87) PCT Pub. No.: WO2022/189345
PCT Pub. Date: Sep. 15, 2022

(65) Prior Publication Data
US 2024/0165931 A1    May 23, 2024

(30) Foreign Application Priority Data
Mar. 9, 2021 (EP) ................................ 21161580

(51) Int. Cl.
| | |
|---|---|
| *B32B 27/08* | (2006.01) |
| *B32B 27/30* | (2006.01) |
| *B32B 27/32* | (2006.01) |
| *B32B 37/12* | (2006.01) |
| *B32B 37/15* | (2006.01) |
| *C08L 23/12* | (2006.01) |

(52) U.S. Cl.
CPC ............ *B32B 27/08* (2013.01); *B32B 27/302* (2013.01); *B32B 27/32* (2013.01); *B32B 37/1284* (2013.01); *B32B 37/153* (2013.01); *C08L 23/12* (2013.01); *B32B 2250/246* (2013.01); *B32B 2307/308* (2013.01); *B32B 2307/558* (2013.01); *B32B 2307/7376* (2023.05); *B32B 2439/80* (2013.01)

(58) Field of Classification Search
CPC ....... B32B 27/08; B32B 27/302; B32B 27/32; B32B 37/1284; B32B 37/153; B32B 2250/246; B32B 2307/308; B32B 2307/558; B32B 2307/7376; B32B 2439/80; B32B 2250/03; B32B 2250/04; B32B 2250/24; B32B 2250/242; B32B 2270/00; B32B 2274/00; B32B 2307/31; B32B 2307/7244; B32B 2439/06; B32B 2439/46; B32B 3/08; B32B 7/022; B32B 7/12; B32B 27/18; B32B 27/283; B32B 27/36; B32B 1/08; C08L 23/12; C08L 23/14; C08L 53/025
See application file for complete search history.

(56) References Cited

U.S. PATENT DOCUMENTS

| | | | |
|---|---|---|---|
| 5,681,627 A | 10/1997 | Mueller | |
| 5,783,269 A | 7/1998 | Heilmann et al. | |
| 9,040,132 B2 * | 5/2015 | Choi | B32B 27/302 |
| | | | 428/35.9 |
| 2022/0032592 A1* | 2/2022 | Holzer | B32B 27/302 |
| 2024/0002617 A1* | 1/2024 | Holzer | B32B 27/32 |

FOREIGN PATENT DOCUMENTS

| | | |
|---|---|---|
| DE | 20320212 U1 | 9/2004 |
| DE | 10361851 A1 | 7/2005 |
| EP | 0199871 A2 | 11/1986 |
| EP | 0229475 A1 | 7/1987 |
| WO | WO-2010110793 A1 * | 9/2010 ................ A61J 1/10 |
| WO | 2020/127227 A1 | 6/2020 |

OTHER PUBLICATIONS

DE 203 20 212 U1 machine translation (Year: 2004).*
DE 103 61 851 A1 machine translation (Year: 2005).*
International Preliminary Report on Patentability of International PCT Application No. PCT/EP2022/055728, dated Sep. 21, 2023.
International Search Report of International Application No. PCT/EP2022/055728, dated Jun. 2, 2022.

* cited by examiner

*Primary Examiner* — Blaine Copenheaver
(74) *Attorney, Agent, or Firm* — RAPHAEL BELLUM PLLC

(57) ABSTRACT

Heat-sterilizable multilayer film having a high low-temperature impact strength comprising (a) a first polymer layer (A) containing polypropylene homopolymer modified with impact modifier; (b) a second polymer layer (B) containing: B1) 51% to 68% by weight of polypropylene terpolymer; B2) 12% to 22% by weight of styrene block copolymer elastomer; B3) 15% to 35% by weight of propylene-ethylene copolymer and (c) a middle polymer layer (C) containing: C1) 20% to 30% by weight of styrene block copolymer elastomer, C2) 15% to 30% by weight of polyethylene elastomer; C3) 40% to 65% by weight of propylene-ethylene copolymer; for use for medical packagings.

19 Claims, No Drawings

FLEXIBLE MULTILAYER FILM HAVING HIGH LOW-TEMPERATURE IMPACT STRENGTH FOR MEDICAL PACKAGINGS

The invention relates to heat-sterilizable multilayer films based on aliphatic polyolefins that have a particularly good impact strength at relatively low temperatures, to a method for producing said films, and to the use of said films for medical packages.

Multilayer films have had a broad range of applications for many years, for example in the food industry, but also in the medical/pharmaceutical sector, for example as secondary packaging material (overpackaging) or primary packaging material for solution bags, dry concentrates and medicaments in tablet form.

Some multilayer films are processable into flexible packages which are, for example, suitable as bags for packaging and administering medical solutions. Medical solutions, for example infusion solutions for parenteral administration, in flexible disposable bags made of polyvinyl chloride (PVC) or non-PVC materials are currently found on the market as standard practice.

Not only must said bags have the ability to collapse, which ensures complete drainage of the bag, but they must also exhibit further performance criteria such as transparency, ability to undergo hot-steam sterilization at 121° C., sufficient mechanical strength especially under dynamic load in the region of weld seams, good barrier to water vapor, load capacity for standard pressure-cuff applications, for example pressure infusions, and a minimal effect by the package on the bag contents from a pharmaceutical perspective. Multilayer films having a layer structure based on polyolefins have been found to be advantageous in relation to the aforementioned properties.

U.S. Pat. No. 5,681,627 describes multilayer films—for medical applications such as medical bags—containing a) a first outer layer containing polyurethane (PU);
- b) a second outer layer (inner surface of a bag, sealing layer) preferably composed of a blend of PP homopolymer or copolymer and elastomer; and
- c) a central layer composed of a polymeric adhesion promoter, preferably an ethylene/α-olefin copolymer. Preferably, the second outer layer used is a blend of a propylene/ethylene copolymer (80%) and a SEBS block copolymer (20%).

U.S. Pat. No. 5,695,840 describes 5-ply multilayer films—for medical applications such as medical bags—containing a) a first layer (inner surface of a bag, sealing layer) composed of a blend of PP homopolymer or copolymer and elastomer;
- b) a second (central) layer adjacent to a) and composed of an ethylene/alpha-olefin copolymer; c) a third (central) layer (ethylene/alpha-olefin copolymer) adjacent to b);
- d) an adhesion-promoting fourth layer (anhydride-modified copolymers) adjacent to c); and e) a fifth layer (outer layer) composed of a polyamide or copolyester.

U.S. Pat. No. 5,783,269 discloses heat-sterilizable multilayer films for producing medical bags, containing an outer layer (2), a supporting layer (4) and a flexible central layer (3) with or without a heat-sealing layer (5), wherein all the layers contain polyolefin homopolymers and/or polyolefin copolymers (softening temperature: (2) and (4) >121° C., (3) <70° C. Example 4-ply films are made up of: (2) and (4) PP homopolymer, (3) PE or PP copolymer, (5) PP copolymer.

EP-A 0229475 describes a multilayer film, preferably a 3-ply multilayer film, for medical containers, containing (a) a first (=inner) heat-sealable layer composed of a mixture of a (i) polypropylene, (ii) an ethylene copolymer and (iii) a modifier such as a further ethylene copolymer or an elastomer (e.g. EPDM terpolymer, SBS, SEBS and SIS copolymer); (b) a second (central) layer composed of a mixture of (i) polyethylene (PE) (50% to 90% by weight) and (ii) a modifier; and (c) a third (outer) layer composed of a mixture of (i) polypropylene and (ii) a modifier. Preference is given to using modified PP copolymers for the outer layer.

EP-A 0199871 describes a flexible multilayer film, inter alia 3-ply multilayer film, for medical bags, comprising: (a) an (inner) sealant layer containing an (optionally modified) ethylene-propylene copolymer (ethylene content: 3.8% by weight); (b) a central layer composed of a flexible polymeric material (e.g. an elastomeric copolymer or terpolymer such as EPDM) and (c) an outer layer containing an ethylene-propylene copolymer.

DE-A 10361851 and WO 2020/127227 A1 describe a heat-sterilizable 3-ply multilayer film for producing medical bags, the outer layer of which consists of polypropylene homopolymer modified with impact modifiers (at least 70% by weight, 97% by weight in the example), the central layer of which consists of polypropylene terpolymer modified with impact modifiers, and the (sealable) inner layer of which consists of polypropylene terpolymer and/or polypropylene copolymer modified with impact modifiers. Suitable impact modifiers are styrene-ethylene/butylene (SEBS) block copolymers, styrene-ethylene/propylene (SEPS) block copolymers or ethylene/α-olefin copolymers. The central layer can contain 20% to 80% by weight of PP terpolymer, 0% to 40% by weight of polyethylene copolymer, 0% to 60% by weight of SEB block copolymer or SEP block copolymer. Example films have a central layer composed of 75% by weight of PP terpolymer, 20% by weight of SEBS block copolymer and 5% by weight of PE plastomer (ethylene/octene copolymer), and an inner layer composed of 85% or 75% by weight of PP terpolymer, 15% or 20% by weight of SEB block copolymer and 0% or 5% by weight of PE plastomer.

DE 203 20 212 A1 describes a heat-sterilizable 3-ply multilayer film produced by coextrusion for use for medical bags. Example films have an outer layer composed of 97% by weight of polypropylene homopolymer and 3% by weight of SEBS block copolymer, a central layer composed of 80% by weight of EXCELLEN, a heterophasic copolymer based on polypropylene and polyethylene, and 20% by weight of SEBS block copolymer, and an inner layer composed of 75% by weight of PP terpolymer, 20% by weight of SEBS block copolymer and 5% by weight of PE plastomer.

Although the known films already achieved good results in respect of flexibility, ability to undergo heat sterilization, and transparency, said films still have room for improvement, especially in respect of impact strength, in particular at relatively low temperatures, in many cases 4° C. to −70° C., in particular −18° C. to −40° C., and are of limited suitability for medical packages stored in a refrigerator or freezer.

Materials on the market for deep-freezing applications are, firstly, packages (e.g. bags) made of pure polyethylene (e.g. for food) or made of polyvinyl chloride (e.g. for blood plasma). PE bags, which have a very good low-temperature impact strength, have the disadvantage that they are unsuitable for heat-sterilization at 121° C., as required for medical films.

PVC-containing materials are regarded as harmful to health, since they usually contain plasticizers that often leak, and so attempts are being made to replace PVC with alternative materials. This is all the more true for medical packages and for packages stored in a refrigerator or freezer.

It is therefore an object of the invention to provide a heat-sterilizable multilayer film for medical packages requiring a particularly good low-temperature impact strength that does not have the abovementioned disadvantages. Furthermore, the multilayer film, or packages produced therefrom, shall maintain properties such as high transparency, ability to undergo hot-steam sterilization at 121° C., sufficient mechanical strength especially under dynamic load in the region of weld seams, good barrier to water vapor, load capacity for standard pressure-cuff applications, for example pressure infusion, and the ability of bags to collapse.

It is a further object of the invention to provide a method for producing the heat-sterilizable multilayer film, in particular a method for producing a film sleeve based on the heat-sterilizable multilayer film.

The invention provides a heat-sterilizable multilayer film comprising (consisting of)
- a) a first polymer layer (A) containing (consisting of) at least one, preferably one, polypropylene homopolymer modified with at least one, preferably one, impact modifier;
- b) a second polymer layer (B) containing (consisting of):
  - B1) 51% to 68% by weight—based on (B)—of at least one polypropylene terpolymer;
  - B2) 12% to 22% by weight—based on (B)—of at least one styrene block copolymer (SBC) elastomer;
  - B3) 15% to 35% by weight—based on (B)—of at least one propylene-ethylene (block) copolymer, in which—based on (B3)—the proportion of the structural units of ethylene ≥9% by weight, often 9% to 15% by weight, preferably ≥10% by weight; and
- c) a central polymer layer (C) situated between the first polymer layer (A) and the second polymer layer (B), containing (consisting of):
  - C1) 20% to 30% by weight—based on (C)—of at least one styrene block copolymer (SBC) elastomer;
  - C2) 15% to 30% by weight—based on (C)—of at least one polyethylene elastomer which is a copolymer of ethylene with an alpha-olefin containing 4 to 12 carbon atoms;
  - C3) 40% to 65% by weight—based on (C)—of at least one propylene-ethylene (block) copolymer, in which—based on (C3)—the proportion of the structural units of ethylene is ≥9% by weight, often 9% to 15% by weight, preferably ≥10% by weight.

The proportions indicated in percent by weight add up to 100% by weight in each case.

In the context of the present invention, the structural units of a monomer in a (co)polymer are to be understood to mean the structural units derived from the monomer incorporated by polymerization.

The term "heat-sterilizable" means that corresponding materials can be subjected to sterilization at elevated temperatures, preferably steam sterilization. Sterilization refers to methods by means of which materials and articles are cleared of living microorganisms. The state of the materials and articles that is thereby achieved is referred to as "sterile". In the case of the steam sterilization of the filled or unfilled medical packages, hot steam is used for the sterilization, which is typically carried out in an autoclave. This involves heating the medical packages for preferably 20 minutes to 121° C. at 2 bar pressure in steam. The air inside the autoclave is completely replaced by steam.

The term "multilayer film" refers to thermoplastic materials in multiple coextruded polymer layers which are joined together to form a film in the form of a running web or sleeve.

The term "impact modifier" refers to polymeric materials, such as styrene block copolymer elastomers, polyethylene elastomers and polypropylene elastomers, which as a result of blending in the melt state improve the impact strength of the polymer surrounding the impact modifier.

The term "impact strength" refers to the property of a material to withstand a dynamic load. The Izod impact strength of plastics can be measured under defined conditions in accordance with the standard DIN EN ISO 180: 2013-08.

First Polymer Layer (A)

The first polymer layer (A) of the multilayer film according to the invention is, by definition, the polymer layer which, when processing the film into a package that is preferably a bag, is situated on the outside of the package. Therefore, it is in direct contact with the surface of the welding tool when further processing the film into packages and therefore preferably requires a high melting/softening temperature which is preferably above 125° C., particularly preferably between 127° C. and 150° C. and very particularly preferably between 130° C. and 145° C.

The first polymer layer (A) contains at least one, preferably one, polypropylene homopolymer which is modified with at least one, preferably one, impact modifier.

Preferably, the first polymer layer (A) consists of at least one, preferably one, polypropylene homopolymer which is modified with at least one, preferably one, impact modifier.

More preferably, the first polymer layer (A) contains one polypropylene homopolymer which is modified with one impact modifier.

The first polymer layer (A) contains (or consists of) at least one, preferably one, polypropylene homopolymer which is generally modified with 1% to 30% by weight, preferably with 2% to 20% by weight, particularly preferably 2% to 10% by weight, in particular 3% to 5% by weight, of at least one impact modifier to improve (low-temperature) impact strength.

The preparation of polypropylene homopolymers is known. Furthermore, polypropylene homopolymers are commercially available, for example from Lyondell Basell Corporation, USA.

Preferably, the first polymer layer (A) contains (or consists of) a polypropylene homopolymer which is modified with at least one impact modifier selected from the group of styrene block copolymers, such as styrene-ethylene-butylene-styrene block copolymers (SEBS), styrene-ethylene-propylene-styrene block copolymer (SEPS), styrene-isoprene-styrene block copolymer (SIS), and styrene-butadiene-styrene block copolymer (SBS), preferably SEBS and SEPS, in particular SEBS, and/or from the group of copolymers of ethylene with at least one alpha-olefin containing 4 to 16, preferably 4 to 12, particularly preferably 4 to 8, carbon atoms, such as ethylene-butylene copolymers and/or ethylene-octene copolymers ethylene.

Particularly preferably, the first polymer layer (A) contains (or consists of) 90% to 98% by weight, in particular 95% to 97% by weight, of a polypropylene homopolymer and 2% to 10% by weight, in particular 3% to 5% by weight, of a styrene block copolymer and/or a copolymer of ethylene with at least one alpha-olefin containing 4 to 12, preferably 4 to 8, carbon atoms.

In a preferred embodiment, the first polymer layer (A) contains (or consists of) 95% to 97% by weight of a polypropylene homopolymer and 3% to 5% by weight of a styrene-ethylene/butylene block copolymer.

The specified weights for the components of the first polymer layer (A) are based on the total weight of the first polymer layer (A).

Second Polymer Layer (B)

The second polymer layer (B) is, by definition, the polymer layer which, when processing the multilayer film according to the invention into a package that is preferably a bag, is situated on the inside of the package. Said polymer layer is responsible for the ability to tightly seal the package by heat sealing. The second polymer layer (B) of the film must be heat-sealable with itself and with appropriately inserted port elements in a secure manner and at a lowest possible temperature and with a shortest possible welding time and nevertheless be heat-sterilizable at temperatures of greater than 121° C. A low welding temperature is particularly important for minimizing structural stresses on the film structure. Therefore, the melting/softening temperature of the second polymer layer (B) is generally above 121° C., preferably between 122° C. and 135° C., particularly preferably between 124° C. and 130° C., but in any case below the melting/softening temperature of the first polymer layer (A).

The second polymer layer (B) of the multilayer film according to the invention contains (or consists of)
components B1), B2) and B3) in the following proportions (based in each case on (B)):
B1) 51% to 68% by weight, preferably 55% to 67% by weight, particularly preferably 56% to 66% by weight;
B2) 12% to 22% by weight, preferably 13% to 21% by weight, particularly preferably 14% to 20% by weight;
B3) 15% to 35% by weight, preferably 17% to 32% by weight, particularly preferably 18% to 30% by weight.

Component B1

Component B1) is at least one, preferably one, polypropylene terpolymer. The term "terpolymer" denotes a copolymer which has been prepared from three different monomers.

The term "polypropylene terpolymer" refers to a polypropylene molecular chain modified with two additional comonomers in the polymerization process. Preferred additional comonomers are ethylene and/or at least one $C_4$-$C_{12}$ α-olefin, preferably ethylene and a $C_4$-$C_{12}$ α-olefin, particularly preferably ethylene and a $C_4$-$C_8$ α-olefin, very particularly preferably ethylene and 1-butene.

Preferably, B1) is a terpolymer of propylene, ethylene and a $C_4$-$C_{12}$ α-olefin, in which the proportion of ethylene is preferably 1% to 4% by weight and the proportion of the $C_4$-$C_{12}$ α-olefin, preferably $C_4$-$C_8$ α-olefin, in particular 1-butene, is preferably 9% to 12% by weight, based in each case on (B1).

The proportions by weight are based in each case on the structural units of the monomers incorporated into the terpolymer (B1) by polymerization.

Very particularly preferably, the polypropylene terpolymer (component B1)) is made up of structural units of propylene, ethylene and butylene.

The monomers are generally randomly incorporated in the polypropylene terpolymer (=component B1), i.e. polypropylene terpolymer B1) is usually a random polypropylene terpolymer.

The polypropylene terpolymer B1) is modified with components B2) and B3), which act as impact modifiers, to improve impact strength, particularly at low temperatures.

Component B2

Component B2) is at least one, preferably one, styrene block copolymer (SBC) elastomer.

The term "styrene block copolymer elastomer" refers to synthetic thermoplastic elastomers based on styrene block copolymers for impact modification of polypropylene.

The at least one styrene block copolymer (SBC) elastomer B2) is preferably selected from the group consisting of: styrene-ethylene-butylene-styrene block copolymer (SEBS), styrene-ethylene-propylene-styrene block copolymer (SEPS), styrene-ethylene-ethylene-propylene-styrene block copolymer (SEEPS), styrene-isoprene-styrene block copolymer (SIS) and styrene-butadiene-styrene block copolymer (SBS), and particularly preferably SEBS and SEPS, in particular SEBS.

It is also possible to partially replace the styrene block copolymer (SBC) elastomer with one or more thermoplastic olefin-based elastomers (TPE-O) (proportion of TPE-O: not more than 45% by weight, preferably 20% to 30% by weight).

Preferably, component B2) is a styrene block copolymer (SBC) elastomer which does not contain any proportions of a thermoplastic olefin-based elastomer.

Component B3

Component B3) is at least one, preferably one, propylene-ethylene (block) copolymer, in which—based on (B3)—the proportion of the structural units of ethylene is ≥9% by weight, often 9% to 15% by weight, preferably ≥10% by weight, more preferably 10% to 12% by weight.

Propylene-ethylene copolymers B3) are often also referred to as "heterophasic" copolymers. Generally, the propylene-ethylene copolymer B3) is a propylene-ethylene block copolymer which has ethylene and propylene polymer blocks and thereby forms a heterogeneous phase (morphology).

Heterophasic propylene-ethylene (block) copolymers B3) differ both in their composition (proportion of the ethylene structural units ≥9% by weight) and in their properties from propylene-ethylene copolymers with a random distribution of the two monomers—which are not used according to the invention as component B3)—in which the proportion of the structural units of ethylene is generally not more than 8% by weight, in many cases not more than 5% by weight. Such random propylene-ethylene copolymers usually form a homogeneous phase (morphology).

Preferably, the second polymer layer (B) according to the invention contains (or consists of): a polypropylene terpolymer (component B1) made up of structural units of propylene, ethylene and butylene, a styrene-ethylene-butylene-styrene block copolymer (SEBS) (component B2), and a propylene-ethylene (block) copolymer (component B3).

Particularly preferably, the second polymer layer (B) according to the invention contains (or consists of):
B1) 55% to 67% by weight, preferably 56% to 66% by weight, of a polypropylene terpolymer made up of structural units of propylene, ethylene and butylene;
B2) 13% to 21% by weight, preferably 14% to 20% by weight, of a styrene-ethylene-butylene-styrene block copolymer (SEBS); and
B3) 17% to 32% by weight, preferably 18% to 30% by weight, of a propylene-ethylene (block) copolymer (component B3).

The specified weights for components B1), B2) and B3) of the second polymer layer (B) are based on the total weight of the second polymer layer (B).

Central Polymer Layer (C)

The central polymer layer (C) has the largest proportion by mass (at least 50% by weight) of the multilayer film, preferably 60% to 95% by weight, particularly preferably 70% to 90% by weight, very particularly preferably 75% to 85% by weight of the entire multilayer film, and is used to improve the impact strength of the overall structure.

The central polymer layer (C) of the multilayer film according to the invention contains (or consists of) components C1), C2) and C3) in the following proportions (based in each case on (C)):

C1) 20% to 30% by weight, preferably 21% to 30% by weight, particularly preferably 22% to 27% by weight;
C2) 15% to 30% by weight, preferably 15% to 25% by weight, particularly preferably 17% to 23% by weight;
C3) 40% to 65% by weight, preferably 45% to 65% by weight, particularly preferably 50% to 60% by weight, very particularly preferably 52% to 57% by weight.

Component C1

Component C1) is at least one, preferably one, styrene block copolymer (SBC) elastomer.

Styrene block copolymer (SBC) elastomer C1) has been defined as component B2), and so reference is made to the relevant discussions in relation to component B2).

Component C2

Component C2) is at least one, preferably one, polyethylene elastomer which is a copolymer of ethylene with an alpha-olefin containing 4 to 12, preferably 4 to 8 carbon atoms.

The proportion of the structural units of the alpha-olefin—based on (C2)—is preferably 20% to 30% by weight.

Particularly preferably, the polyethylene elastomer C2) is an ethylene-butylene copolymer and/or an ethylene-1-octene copolymer, in particular an ethylene-1-octene copolymer.

Component C3

Component C3) is at least one, preferably one, propylene-ethylene (block) copolymer, in which—based on (C3)—the proportion of the structural units of ethylene is ≥9% by weight, often 9% to 15% by weight, preferably ≥10% by weight, more preferably 10% to 12% by weight.

Propylene-ethylene (block) copolymer C3) has been defined as component B3), and so reference is made to the relevant discussions in relation to component B3).

Preferably, the central polymer layer (C) according to the invention contains (or consists of) a styrene-ethylene-butylene-styrene block copolymer (SEBS) (component C1)), an ethylene-1-octene copolymer (component C2)), and a propylene-ethylene (block) copolymer (component C3)).

Particularly preferably, the central polymer layer (C) according to the invention contains (or consists of):

C1) 21% to 30% by weight, preferably 22% to 27% by weight, of a styrene-ethylene-butylene-styrene block copolymer (SEBS);
C2) 15% to 25% by weight, preferably 17% to 23% by weight, of an ethylene-octene copolymer; and
C3) 45% to 65% by weight, preferably 50% to 60% by weight, of a propylene-ethylene (block) copolymer (component C3)).

The specified weights for components C1), C2) and C3) of the central polymer layer (C) are based on the total weight of the central polymer layer (C).

Functional Layer (D)

The heat-sterilizable multilayer film according to the invention can further comprise an additional functional layer D) as an outer layer which is adjacent to the first polymer layer (A) on the outer side of (A), i.e. on the other side of (A) opposite the side with polymer layer (C).

Functional layer (D) preferably makes the heat-sterilizable multilayer film, and packages such as medical bags produced therefrom or film sleeves produced therefrom, gasproof and/or waterproof.

Functional layer D) contains, preferably consists of, at least one, preferably one, material selected from the group consisting of: ethylene-vinyl alcohol copolymers, polyvinyl alcohols, polyamides, liquid crystal polymers (LCP), aromatic polyesters, preferably terephthalic acid polyesters, particularly preferably polyethylene terephthalates (PET), silicon oxide ($SiO_x$), aluminum oxide ($AlO_x$) and acrylate-based polymers.

Preferably, the functional layer (D) consists of $PET/SiO_x$.

The functional layer (D) preferably has a layer thickness of 5 to 25 µm, in particular of 10 to 20 µm.

A functional layer (D) composed of $PET/SiO_x$ significantly improves the gas barrier (e.g. the oxygen barrier) of the heat-sterilizable multilayer film according to the invention, and so the film is also highly suitable for the storage of oxygen-sensitive ingredients.

A $SiO_x/PET$ functional layer (D) can lower the oxygen barrier or oxygen transmission rate (OTR) of the heat-sterilizable multilayer film according to the invention by a factor of 1000 to OTR values <1 $cm^3/(m^2 \times day)$ ASTM F1927 (23° C., 50% RH).

Multilayer Film

Preferably, the heat-sterilizable multilayer film according to the invention consists of the polymer layers (A), (B) and (C).

In each of the polymer layers (A), (B) and (C), the multilayer film can contain customary amounts of customary additives and/or processing aids that are suitable for the intended use of the multilayer film.

Preferred additives are antioxidants and thermal stabilizers (phosphitic and phenolic stabilizers such as Irgafos® 168, Irgafos P-EPQ, Irganox® 1076 or Irganox 1010), and also acid scavengers such as DHT-4A®, synthetic hydrotalcite (SHT) and magnesium oxide (MgO).

Preferably, the heat-sterilizable multilayer film composed of the polymer layers (A), (B) and (C) according to the invention contains at least one antioxidant, one thermal stabilizer and/or one acid scavenger, preferably in a total amount of <3000 ppm, based on the entire multilayer film.

Preferably, the polymer layers (A), (B) and (C) adhere to one another without use of an adhesion promoter, i.e. the multilayer film according to the invention composed of the polymer layers (A), (B) and (C) preferably does not contain an adhesion promoter. Furthermore, preferably at least the second polymer layer (B) does not contain further additives and/or processing aids (e.g. modifiers or plasticizers, such as mineral oil), very particular preference being given to none of the polymer layers (A), (B) and (C) containing further additives and/or processing aids in addition to the additives mentioned above as preferred. Accordingly, the medicament or the medical solution is not affected or hardly affected by the multilayer film according to the invention as packaging material during sterilization and storage.

In the case of a multilayer film according to the invention consisting of the polymer layers (A), (B), (C) and the functional layer (D), the multilayer film generally contains an adhesion promoter or pressure-sensitive adhesive in addition to the additives mentioned above as preferred.

The layer thickness of the first polymer layer (A) is generally 5% to 15% by weight, preferably 7% to 13% by weight, particularly preferably 7.5% to 10% by weight, of the total film thickness of the multilayer film according to the invention.

The layer thickness of the second polymer layer (B) is generally 5% to 15% by weight, preferably 7% to 13% by weight, particularly preferably 7.5% to 10% by weight, of the total film thickness of the multilayer film according to the invention.

The central polymer layer (C) has the largest proportion (preferably at least 70% by weight of the total film thickness) of the multilayer film according to the invention and is used to improve the impact strength of the overall structure.

In a multilayer film consisting of (A), (B) and (C), the layer thickness of the central polymer layer (C) is generally 70% to 85% by weight, preferably 74% to 80% by weight.

If present, the layer thickness of the optional functional layer (D) is preferably 2.5% to 12.5% by weight, particularly preferably 5% to 10% by weight, of the total film thickness of the multilayer film according to the invention.

The total film thickness of the multilayer film according to the invention is preferably 50 to 500 µm, particularly preferably 100 to 400 µm, very particularly preferably 150 to 300 µm.

The total film thickness of a multilayer film according to the invention consisting of the polymer layers (A), (B) and (C) is preferably 50 to 500 µm, particularly preferably 100 to 400 µm, very particularly preferably 150 to 300 µm.

Particular preference is given to a multilayer film according to the invention which consists of the polymer layers (A), (B) and (C) and is characterized in that the total film thickness of the multilayer film is 50 to 500 µm, particularly preferably 100 to 400 µm, and—based in each case on the total film thickness of the multilayer film—the layer thickness of the first polymer layer (A) is 5% to 15% by weight, preferably 7% to 13% by weight, the layer thickness of the second polymer layer (B) is 5% to 15% by weight, preferably 7% to 13% by weight; and the layer thickness of the central polymer layer (C) is 70% to 85% by weight, preferably 74% to 80% by weight; and the proportions of (A), (B) and (C) add up to 100% by weight in each case.

Method for Producing the Multilayer Film

The invention further provides a method for producing the multilayer film according to the invention, wherein the first polymer layer (A), the central polymer layer (C) and the second polymer layer (B) are coextruded.

Coextrusion comprises bringing together the plastics melts of the polymer layers (A), (B) and (C) before they leave the profile die of an extruder to form the multilayer film according to the invention.

In many cases, the extrusion process is a two-stage process. In a first step, the materials used for the individual polymer layers are mixed and compacted in extruders, preferably parallel twin-screw extruders (compounders), heating/cooling mixers or pellet presses. The plastics melts of the polymer layers (A), (B) and (C) are then brought together in another extruder, which is directly coupled or spatially and temporally separated, before they leave the profile die to form the multilayer film according to the invention.

Preferably, the multilayer film obtained by the method according to the invention is shock-cooled with water.

The coextrusion can yield the multilayer film according to the invention in the form of a flat film (flat film method, for example when using a slot die) or a film sleeve (blown film method, for example flooding the interior of the film sleeve with—preferably sterile-filtered—air), with, in the case of a film sleeve, the outside consisting of the first polymer layer (A) and the inside consisting of the second polymer layer (B).

In a further method step, the optional functional layer (D) can be applied to the multilayer film obtained by the method according to the invention, for example by hot lamination or preferably by lamination.

According to a particular embodiment for producing a laminated multilayer film sleeve according to the invention, the method according to the invention comprises the following steps:

(a') producing a film sleeve made of the multilayer film according to the invention by a blown film method, wherein the interior of the film sleeve is flooded with—preferably sterile-filtered—air;

(b') optionally cooling the film sleeve produced in method step (a');

(c') coating the optionally cooled film sleeve with a pressure-sensitive adhesive layer on at least one side (first polymer layer (A)) of the film sleeve;

(d') optionally drying the film sleeve provided with the pressure-sensitive adhesive layer;

(e') laminating the at least one side (first polymer layer (A)) of the film sleeve coated with the pressure-sensitive adhesive layer with a functional layer (D), in particular a SiO$_x$/PET functional layer;

(f) optionally drying and curing the laminated film sleeve.

According to the aforementioned embodiment of the method according to the invention, the two parallel inner sides (=second polymer layer (B)) of the film sleeve preferably directly adhere on top of one another after the melt extrusion or coextrusion of the film sleeve, and so it is possible to coat the outer faces (first polymer layers (A)) of the film sleeve while the interior of the film sleeve is closed. The closed interior, which is inflated when the resultant film sleeve is used later, is thus substantially particle-free.

Preferably, in the aforementioned embodiment of the method according to the invention, the interior of the film sleeve is flooded with sterile-filtered air, thus maintaining a laminated multilayer film sleeve which is low in particles and is particularly highly suitable for medical purposes.

Particularly preferably, a laminated multilayer film sleeve which is low in particles is produced by carrying out the aforementioned method according to the invention in a clean room.

In the above embodiment of the method according to the invention, an adhesion promoter allowing complete curing at room temperature after about 2 weeks, preferably 1 week, is preferably used. In a heat chamber, the curing can also be achieved more rapidly at elevated temperature, preferably 30° C. or higher, in many cases 40° C. to 60° C.

Suitable adhesion promoters (pressure-sensitive adhesives, adhesives or laminating adhesives) are, for example, isocyanates, polyurethanes, poly(ethyl acrylate/methacrylic ester), pure acrylate copolymers, vinyl ester/acrylate copolymers or inorganic-organic hybrid polymers.

Preferred adhesion promoters are two-component systems, which can be solvent-based or solvent-free, and silane-based or silane-free, and can be optionally used with an additional "catalyst" to accelerate curing.

Suitable solvent-based two-component systems are, for example, polyurethane adhesives, including commercially available systems such as Dow ADCOTE™ 675A+ADCOTE™ 675C coreactant;

Dow ADCOTE 811A+ADCOTE 811B coreactant;

Dow ADCOTE E735A-75+ADCOTE™ E735C2 coreactant;

MORCHEM PS 241 AE+CS-97 coreactant,
Henkel Loctite Liofol LA2798+Henkel Loctite Liofol LA7371;
Henkel LOCTITE HY 4070 2K hybrid adhesive.

The aforementioned systems can be optionally used with "catalysts", including those such as Dow Catalyst 9L10 (polyisocyanate), Dow Catalyst 9L200 and Dow Catalyst F Adcote 40-3E, which are commercially available.

Suitable solvent-free two-component systems are, for example, polyurethane adhesives, including commercially available systems such as Dow MOR-FREE™ L 75-720 adhesive
+CR 88-720 or CR 88-721 or MOR-FREE™ C 79 S coreactant Dow MOR-FREE™ 203A adhesive+MOR-FREE™ 200C coreactant Dow MOR-FREE™ L705 adhesive+MOR-FREE™ C 79 or MOR-FREE™ C-102 coreactant.

Alternatively, the adhesion promoters used can also be one-component systems, which can be solvent-based or solvent-free, and silane-based or silane-free, and can be optionally used with an additional "catalyst" to accelerate curing.

Suitable solvent-free one-component systems are, for example, Dow MOR-FREE™ ELM 415A (polyurethane adhesive) or SENOBOND® WB FILM LAMINATING ADHESIVE FP NDC 375224, which are commercially available.

Particularly preferably, the adhesive is chosen such that it complies with the requirements of pharmacopeia limits, for example with respect to migration properties, and is preferably free of organic solvents.

Depending on the procedure or desired coating, the adhesive layer can be applied to one side or both sides of the film sleeve produced by coextrusion. This can be done, for example, by spraying or knife coating. Also suitable is the use of aqueous solutions of the relevant adhesive agents.

After said adhesive layers have been applied, the resultant film sleeve can be optionally dried. For example, if the adhesive is applied using water, the drying can be carried out by evaporation of the water. The layer thicknesses of the pressure-sensitive adhesive layers are preferably in the range from 1 to 10 µm.

The invention additionally provides for the use of the multilayer film according to the invention for producing a medical package, preferably a medical bag.

Also provided for by the invention is the use of the medical package according to the invention as a container for at least one medicament.

The medical package according to the invention is especially suitable as a container for at least one medicament, where the multilayer film according to the invention is especially also suitable for packaging and storing medical solutions at sub-zero temperatures owing to the specially modified polymer layer (C).

In a preferred embodiment, the package according to the invention is subdivided into chambers, thus allowing use thereof as a container for a plurality of medicaments at the same time. This is relevant, for example, for those combinations of medicaments that have to be administered together, but are not stable in combination over long periods of time, or for solid medicaments that are administered in the form of a solution or suspension, but not are not stable in the solution or suspension for long periods of time. The constituents of the final dosage form can be stored separately by means of separate chambers and mixed with one another shortly before administration by opening the separation points.

A method for producing a medical package according to the invention, preferably a bag, comprises the steps of:
a) providing at least one heat-sterilizable multilayer film according to the invention;
b) optionally providing one or more port elements and/or flexible tubes;
c) shaping a medical package, preferably a bag, from the at least one heat-sterilizable multilayer film, such that the second polymer layer (B) forms the inner face of the medical package, preferably the bag, and the first polymer layer (A) forms the outer face of the medical package, preferably the bag;
d) optionally positioning the port elements and/or flexible tubes between the inner faces at the contours of the medical package, preferably the bag;
e) contacting the inner faces with one another and with port elements and/or flexible tubes optionally positioned in between at the contours of the medical package, preferably the bag;
f) heat-sealing the inner faces with one another and with port elements and/or flexible tubes optionally positioned in between at the contours of the medical package, preferably the bag.

In step a), the multilayer film according to the invention is preferably provided in the form of a flat film or a tubular film. Depending on the form of the film that is provided, the remainder of the method can differ in specific details. The film sleeve low in particles that is obtained can be laminated with a functional layer (D), for example a $SiO_x$/PET functional layer, by means of additional method steps.

Depending on the use of the medical package according to the invention, preferably the bag, additional elements, such as for example port elements and/or flexible tubes, can be optionally provided in step b) in the method after the multilayer film according to the invention has been provided. Providing these elements is useful, for example, if the medical package according to the invention, preferably the bag, is to be used as a fixed component of a medical device or is to be connected to a medical device. Omitting step b) can be useful, for example, if the medical package, preferably the bag, is used solely for storage of a medicament and is damaged to withdraw the medicament, for example by tearing open or piercing with a cannula.

In step c), the provided multilayer film according to the invention is brought into the form of a medical package, preferably a bag. If a tubular film was provided in step a), the shaping of the medical package, preferably the bag, can, for example, include only the cutting of the tubular film to the desired length, since the second polymer layer (B) already forms the inner face of the tubular film and the first polymer layer (A) the outer face of the tubular film. If a flat film was provided in step a), the medical package, preferably the bag, can, for example, be shaped from one piece of multilayer film in step c) by cutting said piece into a mirror-symmetrical shape and folding it down along the mirror axis, such that the edges of the film lie on top of one another congruently, with the second polymer layer (B) on the inside. Alternatively, the medical package according to the invention, preferably the bag, can, for example, be shaped from two pieces of flat film by cutting the two pieces mirror-symmetrically to one another and placing them congruently on top of one another, with the second polymer layer (B) on the inside. Rectangular shapes are particularly preferred for cutting, since this results in the least material loss and the simplest processability. However, other shapes are also possible, for example it is possible to produce a medical package, preferably a bag, having an aesthetic shape that is appealing to children and distracts them from the actual administration of a medicament.

Depending on whether additional elements such as port elements and/or flexible tubes were provided in step b), said elements can be positioned between the inner faces at the contours of the shaped medical package, preferably the bag, in step d). In the case of a tubular film, this means the insertion of the additional elements into the openings of the tubular film. Here, the elements can be positioned only on two opposite sides of the medical package, preferably the bag. In the case of a flat film, the insertion of the additional elements between the edges of the one or more pieces of flat film that were laid on top of one another congruently in step c) is meant. Here, the elements can be positioned at any points along the edges, most preferably at two opposing edges.

In step e), the inner faces of the shaped medical package, preferably the bag, are contacted with one another and with the additional elements optionally situated between the inner faces at the contours of said bag so that said inner faces can be sealed together by supply of heat and optionally mechanical pressure in step f). With the heat-sealing, the temperature is preferably chosen such that it lies above the melting/softening point of the second polymer layer (B), but below the melting/softening point of the first polymer layer (A). This makes it possible to ensure that the second polymer layer (B) melts at the contours of the medical package, preferably the bag, thereby closing it permanently and fluid-tightly, whereas the first polymer layer (A) retains its shape, thereby maintaining the stability of the medical package, preferably the bag.

An important criterion for the use of the multilayer film according to the invention as primary packaging material for medical solutions is the barrier effect against loss of liquid. Such loss of liquid results in concentration of the active ingredients in solution, which loss of liquid must not exceed specific values. Loss of liquid during storage determines, inter alia, the shelf life of the product. The formulation of the multilayer film according to the invention is chosen such that a very good water vapor barrier is achieved together with good impact strength.

The heat-sterilizable multilayer film according to the invention is distinguished by the fact that it is securely heat-sealable even with port elements by means of a continuous-heat welding method, manages without plasticizers, has hardly any effect on medical solutions and has a high water vapor barrier. At the same time, the multilayer film according to the invention exhibits a significantly improved low-temperature impact strength even at sub-zero temperatures. Multilayer films according to the invention provided with an additional functional layer (D), in particular a $SiO_x$/PET functional layer, have a distinctly improved gas barrier which also makes it possible to store oxygen-sensitive ingredients.

The invention will be more particularly elucidated below on the basis of examples without being limited thereby.

EXAMPLE 1

First Polymer Layer (A)
  97% by weight of Moplen® HP525J from Lyondell Basell Corp., USA/polypropylene homopolymer
  3% by weight of Tuftec® H1062 from Asahi Kasei, Japan/styrene-ethylene/butylene block copolymer The stated formulation was mixed in the melt state in a separate compounding step and granulated for further use.

Second Polymer Layer (B)
  65% by weight of Bormed® TD109CF from Borealis, Austria/polypropylene terpolymer
  15% by weight of Tuftec® H1062 from Asahi Kasei, Japan/styrene-ethylene/butylene block copolymer
  20% by weight of Bormed® SC 820 CF-11 from Borealis, Austria/heterophasic propylene copolymer The stated formulation was mixed in the melt state in a separate compounding step and granulated for further use.

Central Polymer Layer (C)
  55% by weight of Bormed® SC 820 CF-11 from Borealis, Austria/heterophasic propylene copolymer
  25% by weight of Tuftec® H1062 from Asahi Kasei, Japan/styrene-ethylene/butylene block copolymer
  20% by weight of Engage® 8003 from Dow Chemical Company, USA/ethylene-octene polyolefin elastomer The stated formulation was mixed in the melt state in a separate compounding step and granulated for further use.

The melts from the granulated compounds of the first polymer layer (A), the central polymer layer (C) and the second polymer layer (B) were coextruded on a blown-film line with water cooling using process parameters customary for polypropylene (temperature of 180° C. to 230° C.), and a multilayer film was obtained in the form of a film sleeve, the interior of which was flooded with sterile-filtered air.

The film was made with a total thickness of 200 µm, with the first polymer layer (A) and second polymer layer (B) both having a thickness of 15 µm and the central polymer layer (C) having a thickness of 170 µm.

The film produced is sterilizable with hot steam and is permanently heat-sealable with welding tools adjusted to a temperature of 125° C.

EXAMPLE 2

A film sleeve produced according to Example 1 was additionally provided with a functional layer (D) composed of $SiO_x$/PET (Techbarrier T from Mitsubishi) on both sides in a layer thickness of 15 µm in each case.

A two-component adhesive (Dow ADCOTE 811A+AD-COTE 811B coreactant, and Dow Catalyst 9L10, available from Dow Chemical) was first applied to both sides of the film sleeve laid flat, and the film sleeve provided with the adhesive was then laminated on both sides with the functional layer.

The film produced is sterilizable with hot steam and is already permanently heat-sealable with welding tools adjusted to a temperature of 125° C.

EXAMPLE 3 (NOT ACCORDING TO THE INVENTION)

First Polymer Layer (A)
  97% by weight of Moplen® HP525J from Lyondell Basell Corp., USA/polypropylene homopolymer
  3% by weight of Tuftec® H1062 from Asahi Kasei, Japan/styrene-ethylene/butylene block copolymer The stated formulation was mixed in the melt state in a separate compounding step and granulated for further use.

Second Polymer Layer (B)
  70% by weight of Bormed® TD109CF from Borealis, Austria/polypropylene terpolymer
  15% by weight of Tuftec® H1062 from Asahi Kasei, Japan/styrene-ethylene/butylene block copolymer 15% by weight of Bormed® RD804 CF-11, Borealis, Austria/random propylene copolymer The stated formulation was mixed in the melt state in a separate compounding step and granulated for further use.

Central Polymer Layer (C)
  55% by weight of Bormed® TD109CF from Borealis, Austria polypropylene terpolymer
  10% by weight of Bormed® SC 820 CF-11 from Borealis, Austria/heterophasic propylene copolymer
  20% by weight of Tuftec® H1062 from Asahi Kasei, Japan/styrene-ethylene/butylene block copolymer
  15% by weight of Engage® 8003 from Dow Chemical Company, USA/ethylene-octene polyolefin elastomer The stated formulation was mixed in the melt state in a separate compounding step and granulated for further use.

The melts from the granulated compounds of the first polymer layer (A), the central polymer layer (C) and the second polymer layer (B) were coextruded on a blown-film line with water cooling using process parameters customary for polypropylene (temperature of 180° C. to 230° C.), and a multilayer film was obtained in the form of a film sleeve, the interior of which was flooded with sterile-filtered air.

The film was made with a total thickness of 200 µm, with the first polymer layer (A) and second polymer layer (B) both having a thickness of 15 µm and the central polymer layer (C) having a thickness of 170 µm. The film produced is sterilizable with hot steam and is permanently heat-sealable with welding tools adjusted to a temperature of 125° C.

EXAMPLE 4 (COMPARATIVE EXAMPLE (ACCORDING TO EXAMPLE 1 of DE 10361851 A1))

First Polymer Layer (A)
  97% by weight of Moplen® HP525J from Lyondell Basell Corp., USA/polypropylene homopolymer
  3% by weight of Tuftec® H1062 from Asahi Kasei, Japan/styrene-ethylene/butylene block copolymer The stated formulation was mixed in the melt state in a separate compounding step and granulated for further use.

Second Polymer Layer (B)
  85% by weight of Bormed® TD109CF from Borealis, Austria/polypropylene terpolymer
  15% by weight of Tuftec® H1062 from Asahi Kasei, Japan/styrene-ethylene/butylene block copolymer The stated formulation was mixed in the melt state in a separate compounding step and granulated for further use.

Central Polymer Layer (C)
  75% by weight of Bormed® TD109CF from Borealis, Austria/polypropylene terpolymer
  20% by weight of Tuftec® H1062 from Asahi Kasei, Japan/styrene-ethylene/butylene block copolymer
  5% by weight of Engage® 8003, Dow Chemical Company, USA/ethylene-octene polyolefin elastomer The stated formulation was mixed in the melt state in a separate compounding step and granulated for further use.

The film was coextruded on a blown-film line with water cooling using process parameters customary for polypropylene.

The film was made with a total thickness of 200 µm, with the first polymer layer (A) and second polymer layer (B) both having a thickness of 15 µm and the central polymer layer (C) having a thickness of 170 µm. The film produced is sterilizable with hot steam and is permanently heat-sealable with welding tools adjusted to a temperature of 125° C.

The impact strength of the films obtained is checked by carrying out a drop test in accordance with DIN EN ISO 15747:2019-07.

Description:
  production of infusion (IV) bags of the desired size, for example 1000 ml;
  IV bags are filled with, for example, water and tightly closed (e.g. stoppers);
  IV bags are sterilized with hot steam at 121° C. and must completely cool down;
  10 bags are stored at 20° C. for 24 hours, 10 at 4° C. for 24 hours, and 10 at −18° C. for 24 hours;
  the bags are then dropped to the floor from the relevant height (DIN EN ISO 15747:2019-07, Table A.1). A 1000 ml bag is stored at a height of 0.75 m (device) and then dropped to the floor.

The test results for a 1000 ml capacity bag (contents: water) are shown in Table 1.

| Multilayer film | Drop height [m] | Failure rate* Storage at 20° C. | Failure rate* Storage at 4° C. | Failure rate* Storage at −18° C. | Result |
|---|---|---|---|---|---|
| Example 1 | 0.75 | 0/10 | 0/10 | 0/10 | passed |
| Example 2 | 0.75 | 0/10 | 0/10 | 0/10 | passed |
| Example 3 (not according to the invention) | 0.75 | 0/10 | 2/10 | 7/10 | failed |
| Example 4 (comparison) | 0.75 | 0/10 | 7/10 | 10/10 | failed |

Failure rate* defective bags/number of bags tested

The results of the drop test show a direct correlation between the weight proportions of the impact modifier in the central layer and the low-temperature impact strength at sub-zero temperatures. Only the multilayer films of Examples 1 and 2 pass the drop test at temperatures of 4° C. and −18° C., owing to the composition according to the invention (specific impact modifiers in all layers (A), (B) and (C) in specific amounts).

The invention claimed is:

1. A heat-sterilizable multilayer film comprising
  a) a first polymer layer (A) containing at least one polypropylene homopolymer modified with at least one impact modifier;
  b) a second polymer layer (B) containing:
    B1) 51% to 68% by weight, based on (B), of at least one polypropylene terpolymer;
    B2) 12% to 22% by weight, based on (B), of at least one styrene block copolymer (SBC) elastomer; and
    B3) 15% to 35% by weight, based on (B), of at least one propylene-ethylene copolymer, wherein, based on (B3), the proportion of the structural units of ethylene is ≥9% by weight; and
  c) a central polymer layer (C) situated between the first polymer layer (A) and the second polymer layer (B), containing:
    C1) 20% to 30% by weight, based on (C), of at least one styrene block copolymer (SBC) elastomer;
    C2) 15% to 30% by weight, based on (C), of at least one polyethylene elastomer which is a copolymer of ethylene with an alpha-olefin containing 4 to 12 carbon atoms; and C3) 40% to 65% by weight, based on (C), of at least one propylene-ethylene copolymer, wherein, based on (C3), the proportion of the structural units of ethylene is ≥9% by weight.

2. The heat-sterilizable multilayer film of claim 1, wherein the second polymer layer (B) contains:
B1) 55% to 67% by weight;
B2) 13% to 21% by weight; and
B3) 17% to 32% by weight.

3. The heat-sterilizable multilayer film of claim 1, wherein component (B1) is a terpolymer of propylene, ethylene, and a $C_4$-$C_{12}$ α-olefin.

4. The heat-sterilizable multilayer film of claim 1, wherein the styrene block copolymer (SBC) elastomer (B2) and/or (C1) is selected from the group consisting of: styrene-ethylene-butylene-styrene block copolymer (SEBS), styrene-ethylene-propylene-styrene block copolymer (SEPS), styrene-ethylene-ethylene-propylene-styrene block copolymer (SEEPS), styrene-isoprene-styrene block copolymer (SIS), and styrene-butadiene-styrene block copolymer (SBS).

5. The heat-sterilizable multilayer film of claim 1, wherein the central polymer layer (C) contains:
C1) 21% to 30% by weight;
C2) 15% to 25% by weight; and
C3) 45% to 65% by weight.

6. The heat-sterilizable multilayer film of claim 1, wherein the polyethylene elastomer (C2) is an ethylene-butylene copolymer and/or an ethylene-octene copolymer.

7. The heat-sterilizable multilayer film of claim 1, wherein the propylene-ethylene copolymer (B3) and/or (C3) is a propylene-ethylene block copolymer.

8. The heat-sterilizable multilayer film of claim 1, wherein the first polymer layer (A) contains 90% to 98% by weight of a polypropylene homopolymer and 2% to 10% by weight of at least one impact modifier selected from styrene block copolymers, copolymers of ethylene with at least one alpha-olefin containing 4 to 12 carbon atoms, and mixtures thereof.

9. The heat-sterilizable multilayer film of claim 1, wherein the multilayer film consists of the polymer layers (A), (B), and (C), and the total film thickness of the multilayer film ranges from 50 to 500 µm and wherein the layer thickness of the first polymer layer (A) is 5% to 15% based on the total multilayer film thickness; the layer thickness of the second polymer layer (B) is 5% to 15% based on the total multilayer film thickness; and the layer thickness of the central polymer layer (C) is 70% to 85% by weight based on the total multilayer film thickness.

10. The heat-sterilizable multilayer film of claim 1, comprising an additional functional layer (D) adjacent to the first polymer layer (A) on the outer side of (A) and wherein the functional layer (D) contains at least one material selected from the group consisting of: ethylene-vinyl alcohol copolymers, polyvinyl alcohols, polyamides, liquid crystal polymers (LCP), aromatic polyesters, silicon oxide ($SiO_x$), aluminum oxide ($AlO_x$), and acrylate-based polymers.

11. The heat-sterilizable multilayer film of claim 10, wherein the functional layer (D) consists of PET/$SiO_x$.

12. A medical package comprising the heat-sterilizable multilayer film of claim 1.

13. A medical package comprising the heat-sterilizable multilayer film of claim 10.

14. A method for producing the heat-sterilizable multilayer film of claim 1, wherein the first polymer layer (A), the central polymer layer (C), and the second polymer layer (B) are coextruded.

15. A method for producing the medical package made of the heat-sterilizable multilayer film of claim 1, comprising the steps of:
a) providing at least one heat-sterilizable multilayer film wherein the first polymer layer (A), the central polymer layer (C), and the second polymer layer (B) are coextruded;
b) optionally providing one or more port elements and/or flexible tubes;
c) shaping the medical package from the at least one heat-sterilizable multilayer film, wherein the second polymer layer (B) forms the inner face of the medical package and the first polymer layer (A) forms the outer face of the medical package;
d) optionally positioning the port elements and/or flexible tubes between the inner faces at the contours of the medical package;
e) contacting the inner faces with one another and with port elements and/or flexible tubes optionally positioned in between at the contours of the medical package; and
f) heat-sealing the inner faces with one another and with port elements and/or flexible tubes optionally positioned in between at the contours of the medical package.

16. A method for producing the medical package made of the heat-sterilizable multilayer film of claim 1, comprising the steps of:
a) providing at least one heat-sterilizable multilayer film;
b) optionally providing one or more port elements and/or flexible tubes;
c) shaping the medical package from the at least one heat-sterilizable multilayer film, wherein the second polymer layer (B) forms the inner face of the medical package and the first polymer layer (A) forms the outer face of the medical package;
d) optionally positioning the port elements and/or flexible tubes between the inner faces at the contours of the medical package;
e) contacting the inner faces with one another and with port elements and/or flexible tubes optionally positioned in between at the contours of the medical package; and
f) heat-sealing the inner faces with one another and with port elements and/or flexible tubes optionally positioned in between at the contours of the medical package,
wherein the heat-sterilizable multilayer film is produced by the following steps:
(1) producing a film sleeve made of a multilayer film, wherein the first polymer layer (A), the central polymer layer (C), and the second polymer layer (B) are coextruded by a blown film method, wherein the interior of the film sleeve is flooded with air;
(2) optionally cooling the film sleeve produced in method step (1);
(3) coating the optionally cooled film sleeve with a pressure-sensitive adhesive layer on at least one side of the first polymer layer (A) of the film sleeve;
(4) optionally drying the film sleeve provided with the pressure-sensitive adhesive layer;
(5) laminating the at least one side of the first polymer layer (A) of the film sleeve coated with the pressure-sensitive adhesive layer with the functional layer (D); and
(6) optionally drying and curing the laminated film sleeve.

17. A method for producing a laminated multilayer film sleeve made of the heat-sterilizable multilayer film of claim 10, comprising the following steps:
- (a') producing a film sleeve made of a multilayer film, wherein the first polymer layer (A), the central polymer layer (C), and the second polymer layer (B) are coextruded by a blown film method, wherein the interior of the film sleeve is flooded with air;
- (b') optionally cooling the film sleeve produced in method step (a');
- (c') coating the optionally cooled film sleeve with a pressure-sensitive adhesive layer on at least one side of the first polymer layer (A) of the film sleeve;
- (d') optionally drying the film sleeve provided with the pressure-sensitive adhesive layer;
- (e') laminating the at least one side of the first polymer layer (A) of the film sleeve coated with the pressure-sensitive adhesive layer with the functional layer (D); and
- (f) optionally drying and curing the laminated film sleeve.

18. A method for producing the medical package made of the heat-sterilizable multilayer film of claim 10, comprising the steps of:
- a) providing at least one heat-sterilizable multilayer film wherein the first polymer layer (A), the central polymer layer (C), and the second polymer layer (B) are coextruded;
- b) optionally providing one or more port elements and/or flexible tubes;
- c) shaping the medical package from the at least one heat-sterilizable multilayer film, wherein the second polymer layer (B) forms the inner face of the medical package and the first polymer layer (A) forms the outer face of the medical package;
- d) optionally positioning the port elements and/or flexible tubes between the inner faces at the contours of the medical package;
- e) contacting the inner faces with one another and with port elements and/or flexible tubes optionally positioned in between at the contours of the medical package; and
- f) heat-sealing the inner faces with one another and with port elements and/or flexible tubes optionally positioned in between at the contours of the medical package.

19. A method for producing the medical package made of the heat-sterilizable multilayer film of claim 10, comprising the steps of:
- a) providing at least one heat-sterilizable multilayer film;
- b) optionally providing one or more port elements and/or flexible tubes;
- c) shaping the medical package from the at least one heat-sterilizable multilayer film, wherein the second polymer layer (B) forms the inner face of the medical package and the first polymer layer (A) forms the outer face of the medical package;
- d) optionally positioning the port elements and/or flexible tubes between the inner faces at the contours of the medical package;
- e) contacting the inner faces with one another and with port elements and/or flexible tubes optionally positioned in between at the contours of the medical package; and
- f) heat-sealing the inner faces with one another and with port elements and/or flexible tubes optionally positioned in between at the contours of the medical package, wherein the heat-sterilizable multilayer film is produced by the following steps:
- (1) producing a film sleeve made of a multilayer film, wherein the first polymer layer (A), the central polymer layer (C), and the second polymer layer (B) are coextruded by a blown film method, wherein the interior of the film sleeve is flooded with air;
- (2) optionally cooling the film sleeve produced in method step (1);
- (3) coating the optionally cooled film sleeve with a pressure-sensitive adhesive layer on at least one side of the first polymer layer (A) of the film sleeve;
- (4) optionally drying the film sleeve provided with the pressure-sensitive adhesive layer;
- (5) laminating the at least one side of the first polymer layer (A) of the film sleeve coated with the pressure-sensitive adhesive layer with the functional layer (D); and
- (6) optionally drying and curing the laminated film sleeve.

* * * * *